(12) United States Patent
Wend et al.

(10) Patent No.: US 9,296,561 B2
(45) Date of Patent: Mar. 29, 2016

(54) DEVICE AND METHOD FOR PROVIDING ITEMS FROM A WAREHOUSE ACCORDING TO A PARTICULAR ORDER

(71) Applicant: Dürkopp Fördertechnik GmbH, Bielefeld (DE)

(72) Inventors: Michael Wend, Bielefeld (DE); Dirk Zajonc, Gütersloh (DE); Sigurd Völker, Vlotho (DE); Dirk Sieksmeier, Spenge (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 52 days.

(21) Appl. No.: 14/248,544

(22) Filed: Apr. 9, 2014

(65) Prior Publication Data
US 2014/0303770 A1  Oct. 9, 2014

(30) Foreign Application Priority Data
Apr. 9, 2013  (DE) .......................... 10 2013 206 240

(51) Int. Cl.
*G06F 7/00* (2006.01)
*B65G 1/137* (2006.01)
*B65G 1/04* (2006.01)

(52) U.S. Cl.
CPC ............ *B65G 1/1376* (2013.01); *B65G 1/0457* (2013.01); *B65G 1/1378* (2013.01); *B65G 2201/0229* (2013.01)

(58) Field of Classification Search
CPC ..................... B65G 1/1376; B65G 2203/0216; B65G 2203/046; B65G 2209/09
USPC ............. 700/214, 215, 216, 224; 414/331.02, 414/13, 222.03; 198/347.1, 347.4, 348, 198/418; 186/20, 21, 24, 58, 69
See application file for complete search history.

(56) References Cited

U.S. PATENT DOCUMENTS

| 5,799,800 | A  |   | 9/1998 | Lux |         |
|-----------|----|---|--------|-----|---------|
| 6,529,798 | B1 | * | 3/2003 | Christ | 700/223 |
| 2006/0195221 | A1 | * | 8/2006 | Tanaka | 700/214 |

FOREIGN PATENT DOCUMENTS

| DE | 4335637 C1 | 6/1995 |
| DE | 20103664 U1 | 6/2001 |
| DE | 102011103194 A1 | 12/2012 |
| EP | 0336714 A2 | 10/1989 |
| WO | 0147792 A2 | 7/2001 |

OTHER PUBLICATIONS

European Search report dated Jul. 14, 2014 in connection with corresponding EP application No. 14160225.0-1707, (5 pages).

* cited by examiner

*Primary Examiner* — Mark Beauchaine
(74) *Attorney, Agent, or Firm* — Browdy and Neimark, PLLC

(57) ABSTRACT

A device for providing items for more than one order from a warehouse according to each particular order comprises at least one temporary storage device linked with the warehouse for temporarily storing items of at least one order, at least one collection zone linked with the at least one temporary storage device for collecting the items of the at least one completed order, and a separation zone having a number of delivery lines for providing the items of the at least one completed order according to the respective order.

16 Claims, 1 Drawing Sheet

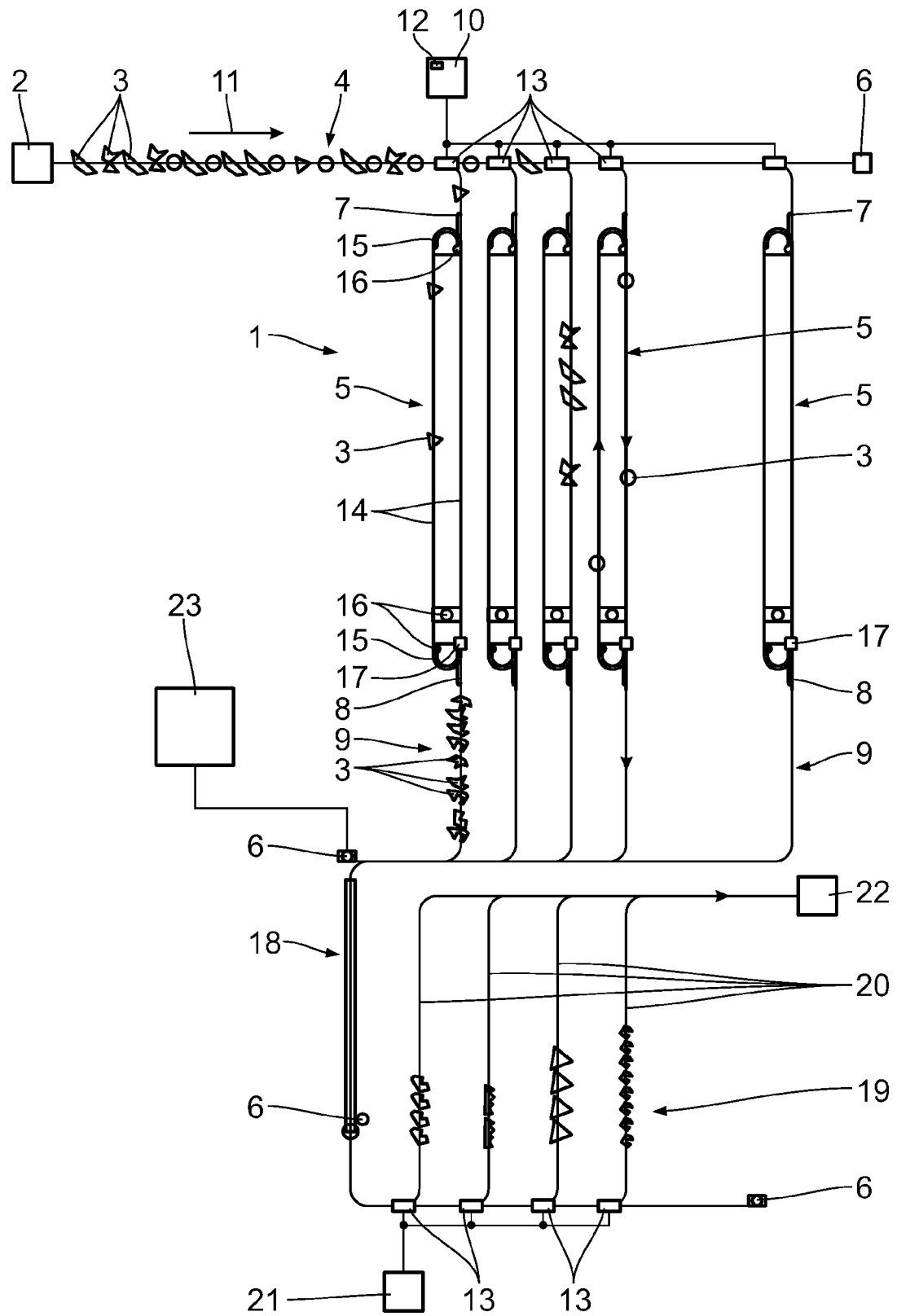

DEVICE AND METHOD FOR PROVIDING ITEMS FROM A WAREHOUSE ACCORDING TO A PARTICULAR ORDER

CROSS-REFERENCES TO RELATED APPLICATIONS

This application claims the priority of Patent Application Serial No. DE 10 2013 206 240.0 filed on 9 Apr. 2013, pursuant to 35 U.S.C. 119(a)-(d), the content of which is incorporated herein by reference in its entirety as if fully set forth herein.

FIELD OF THE INVENTION

The invention relates to a device and a method for providing items from a warehouse according to a particular order.

BACKGROUND OF THE INVENTION

DE 10 2011 103 194 A1 discloses a distributor device for providing items which are sorted by article ID. To this end, circular storage conveyors are filled with articles sorted by article ID in such a way that if a particular article is required for more than one order, then the total number of that particular article is conveyed to a common circular storage conveyor. To complete an order which in particular consists of more than one item, the circular storage containers, which are sorted by article ID, are transported to an outgoing goods zone. The drawback of a device of this type is that if large orders are processed that comprise a large number of different articles, a large number of circular storage containers is required in order to provide the articles which are stored temporarily in such a way as to be sorted by article ID.

An installation and a method for sorting items is known from DE 43 35 637 C1. A three-stage sorting method is described that allows a plurality of unsorted items stored in a warehouse to be provided at an outgoing goods zone according to the respective order. The delivery method is complicated and requires a great amount of effort, particularly as far as the preparation of the sorting procedure is concerned. A method of this type is inefficient.

SUMMARY OF THE INVENTION

It is an object of the present invention to provide a device that facilitates a method for providing items from a warehouse according to more than one order.

This object is achieved by means of a device for providing items for more than one order from a warehouse according to each particular order, the device comprising at least one temporary storage device linked with a warehouse for temporarily storing items of at least one order; a respective collection zone linked with the at least one temporary storage device for collecting the items of the at least one completed order; a separation zone having a number of delivery lines for providing the items of the at least one completed order according to the respective order. According to the invention, it was found that a temporary storage device for temporarily storing items of at least one order may be used as a buffer in the form of a flow of goods for items removed from storage. It is in particular conceivable to buffer the items in the temporary storage device for a period of time that is adapted in such a way as to ensure minimum time intervals between the items of a common order, between the temporary storage device and the outgoing goods zone. The temporary storage device is in particular configured as a waiting loop. According to the invention, it was also found that it is not necessary, in particular for mail order processing, for the items to be provided in an unambiguous sequence. Consequently, the device does not require an additional sorting stage. The device has a collection zone linked with the at least one temporary storage device. The items are temporarily stored in the at least one temporary storage device until all items are available in the temporary storage device that are required to complete a particular order. This means that in particular different items are temporarily stored in one and the same temporary storage device. According to the invention it was found that it is in particular not necessary to temporarily store the articles in the temporary storage devices in such a way as to be sorted by article ID. This allows the temporary storage devices to be used to full capacity. It is not necessary for the temporary storage devices to be sorted by article ID. As a result, the throughput time, in other words the time required for processing orders, is reduced. Once the order is completed, the items are discharged into the collection zone. In particular, more than one temporary storage devices are provided. The collection zone is required for collecting the items of an order that is completely available in the temporary zone. It is in particular conceivable to collect items for different orders in one collection zone. A separation zone is provided to ensure that the items of the completed order are provided according to the respective order. The separation zone is provided with a plurality of delivery lines. All items of the completed order are provided at a particular delivery line. A completed order is conveyed from a delivery line to an outgoing goods zone. In other words, in particular all items of the order are provided at precisely one, in particular predefined delivery line. The inventive device requires less space. The device in particular allows the items to be provided in a fully automated manner.

According to an advantageous embodiment, the at least one temporary storage device has a storage input and a storage output, wherein an identification unit is provided at the storage input and/or at the storage output for identifying the items. This allows the current flow of goods, and in particular a current position of an item in the flow of goods, and in particular inside the device to be detected. The identification unit at the storage input detects the items stored in the temporary storage device, thus in particular allowing one to make sure that all items of an order are completely available in the temporary storage device. An identification unit at the storage output allows the items to be discharged from the at least one temporary storage device into the collection zone in a defined manner.

According to a particularly advantageous embodiment, the storage output is provided with a switch unit which makes sure that an item either remains in the temporary storage device or is discharged into the collection zone. The switch unit is in particular in signal communication with the identification unit which is in particular arranged at the storage output. It is conceivable as well for the switch unit to be in signal communication with an identification unit at the storage input.

According to another advantageous embodiment, the temporary storage device is a circulating storage device. The items temporarily stored in the temporary storage device are stored in a continuously circulating manner, with the result that the space required for the device according to the invention is in particular reduced. In the temporary storage device, the temporarily stored items are continuously available for a subsequent removal. In a particularly advantageous embodiment, the circulating storage device is provided with a conveyor unit that is driven by means of a drive. The conveyor unit in particular allows a circulating conveyor speed to be adjusted variably. This allows a circulation time of the items in the circulating storage device to be adjusted in a defined manner. The circulation time can also be set via the capacity of a conveyor unit used for conveying the items to the circulating storage device.

According to another advantageous embodiment, a sorting unit is provided so as to ensure that the items are supplied to the at least one temporary storage device in a sorted manner. The sorting device is in particular arranged along the flow of goods in front of the storage inlet of the temporary storage device. The sorting unit, which is in particular provided with an identification unit for identifying the items in the flow of goods, allows a first sorting step to be performed in such a way that items of different orders are distributed among different temporary storage devices.

According to an advantageous embodiment, a control unit is provided for controlling the flow of goods. The control unit is in particular configured as a so-called warehouse management system (WMS). The control unit is in particular in signal communication with identification units for identifying the items, with a switch unit at a storage outlet of the at least one temporary storage device, with a conveyor unit of a circulating storage device and with a sorting unit. It is conceivable as well for the control unit to be in signal communication with other components of the device to facilitate control of the flow of goods, in particular allowing the items to be provided in a fully automated manner.

According to another advantageous embodiment, an identification key is provided which is assignable to a particular item. The identification key allows the item to be identified automatically and in particular unambiguously, thus allowing the item to be tracked unambiguously along the flow of goods. Moreover, the items required for a particular order can easily be collected in a fully automated manner. The identification key is in particular a transponder which is in particular attached to the item. Other keys or codings are conceivable as well. It is in particular conceivable to use a bar code or a two-dimensional QR code.

According to another advantageous embodiment, each delivery line is assigned to a separation unit, wherein the separation unit interacts with an identification unit. Advantageously, the identification unit is provided next to the separation unit. It is conceivable as well for the identification unit to be integrated into the separation unit. It is conceivable as well for the separation unit at the delivery line to interact with an identification unit at the storage outlet of the temporary storage device. In this case, the number of components required to implement the device according to the invention can be reduced. The separation unit allows the items transported from the collection zone to the separation zone to be separated from each other, with the result that each delivery line is provided only with the items required for one particular order.

According to another advantageous embodiment, the at least one temporary storage device has a storage capacity such that items of more than one orders can be stored temporarily in the at least one temporary storage device. In other words, the storage capacity of the at least one temporary storage device is at least equal to the sum of two order capacities. The term "order capacity" refers to the number of items of one order.

Another object of the present invention is to simplify a method for providing items from a warehouse according to a particular order.

This object is achieved by a method for providing items for more than one order from a warehouse according to each particular order, the method comprising the following method steps: removing items from a warehouse; conveying the items to at least one temporary storage device according to the respective order; temporarily storing the items of one order until all items of this order are available in the at least one temporary storage device; discharging the items of the completed order from the at least one temporary storage device into a collection zone linked therewith; conveying the items of the respective order from the collection zone to a delivery line of a separation zone provided for the completed order as soon as the order is completed; providing the items of the completed order in the delivery line of the separation zone. According to the invention it was found that items, which are in particular unsorted as long as they are stored in a warehouse, may at first be stored temporarily in at least one temporary storage device after being removed from storage. The temporary storage device acts as a buffer in the flow of goods. The items of an order are not discharged from the temporary storage device into a collection zone linked therewith until the order, in other words all items of the order, is available in the temporary storage device. In other words, an order can be fully processed in the temporary storage device in such a way that the items are stored temporarily until all items of the order are available in the temporary storage device. It is in particular not necessary to provide an extra temporary storage device for different items. The items available in the collection zone are then conveyed to a delivery line of the separation zone provided for this purpose in such a way as to be sorted according to order. It is conceivable for items of different orders to be arranged in the collection zone. The method according to the invention is flexible to use, requiring less time and costs for implementation. In particular it was found that it is not necessary for the items to be provided in a particular sequence at the outgoing goods zone. A sequence of this type is in particular not required for mail order processing.

According to an advantageous embodiment, the items of the completed order are discharged from the delivery line to the outgoing goods zone. This ensures a continuous, in particular fully automated flow of goods from the warehouse to the outgoing goods zone.

According to another advantageous embodiment, the items are stored temporarily in such a way as to circulate in a temporary storage device configured as a circulating storage device. This type of temporary storage turned out to be particularly advantageous to provide a sufficient temporary storage capacity on the one hand while at the same time ensuring a continuous take-up and discharge of the items in the flow of goods.

According to another advantageous embodiment, an examination is performed to ensure that the in particular continuously circulating item available at the storage output of the temporary storage device is assigned to a completed order. If this examination produces a positive result, then—and only then—the item is discharged from the temporary storage device into the collection zone. Otherwise the item remains in the temporary storage device until the order is completed.

According to another advantageous embodiment, the items are supplied to the at least one temporary storage device regardless of a current sequence of the items that are already temporarily stored in the temporary storage device at this particular time. In other words, the method takes advantage of the fact that it is not necessary to provide the items in the flow of goods and in particular in the at least one temporary storage device in a sorted sequence. As a result, the method is easy to implement and cost-effective.

An exemplary embodiment of the invention will be explained in more detail in the following description with reference to the only FIGURE.

BRIEF DESCRIPTION OF THE DRAWING

The FIGURE shows a schematic plan view of a device according to the invention the entirety of which is designated by the reference numeral 1.

DESCRIPTION OF THE PREFERRED EMBODIMENT

A schematically illustrated warehouse 2 is used for storing items 3. The items 3 are in particular stored in the warehouse 2 in an unsorted manner. Removal from the warehouse takes place in an in particular unsorted manner by means of a first conveyor device 4. The items 3 form a flow of goods. In the FIGURE, the items 3 are marked by symbols having different contours. Different symbols refer to different orders. In other words, this means that items 3, which are illustrated by an identical symbol, are assigned to a common order. At the same time, identical symbols may represent different items, for instance if an order comprises different items 3 such as tooth paste and hair gel. Accordingly, it is conceivable as well for items 3 in the FIGURE to be marked by different symbols since these items 3 are assigned to different orders, wherein the differently marked items 3 may be identical items. This is the case if an item such as tooth paste is comprised in a first order as well as in a second order.

Typically, an order comprises an average of approximately twenty items 3. The order volume, in other words the number of items 3 per order, may vary within a large range. In particular, an order is conceivable which consists of only one item 3. However, there may also be orders which comprise up to 100 or more items 3.

In the device 1, the items are handled, in particular conveyed, in particular in an individual packaging such as an individual cardboard box or a closed individual bag. It is conceivable as well that the items 3 are pieces of clothing, in particular suits, jackets, trousers, shirts, blouses. The pieces of clothing may each be suspended from a hanger, thus requiring a corresponding adapter device allowing the pieces of clothing to be conveyed and handled in the device 1 by means of a prior-art transport and handling system provided for this purpose.

Via the first conveyor device 4, the warehouse 2 is linked with a plurality of temporary storage devices 5. The first conveyor device 4 is provided with a drive, in particular an electric motor 6, which allows the items 3 to be conveyed from the warehouse 2 to the temporary storage devices 5 in an automated manner.

In the illustrated exemplary embodiment, the device 1 has five temporary storage devices 5. There may also be more, in particular up to twenty, or less than five temporary storage devices 5. Each temporary storage device 5 has a storage inlet 7 facing the first conveyor device 4. Furthermore, each temporary storage device 5 has a storage outlet 8 via which each temporary storage device 5 is linked with a connection zone 9 linked therewith.

An identification key, which is not shown in more detail, is assigned to each of the items 3. The identification key is in particular configured as a transponder which is secured to the item 3. The transponder is used for automatic identification of the items 3. To this end, a sorting device 10 is provided which is arranged along the direction of conveyance 11 of the first conveyor device 4 of the first temporary storage device 5 shown on the left of the FIGURE. The sorting unit 10 is in particular provided with an identification unit 12. Furthermore, the sorting unit 10 is in signal communication with a number of switches 13. Each switch 13 is assigned to a storage inlet 7 of a temporary storage device 5. Depending on the identification of an item 3 by means of the identification unit 12, the switch 13 either allows the item 3 to pass along the direction of conveyance 11 or ensures a sorted supply of the item 3 to a temporary storage device 5 provided for this purpose. The sorting unit 12 is configured in such a way that the items 3 are supplied to the respective temporary storage devices 5 according to the respective order. This means that items 3 of an order are stored temporarily in one and the same temporary storage device 5. It is conceivable for items 3 of more than one order to be assigned to one temporary storage device 5. This means that the items 3 of different orders may be arranged in one and the same temporary storage device 5.

The temporary storage devices 5 are in each case identical. Each of the temporary storage devices 5 is configured as a circulating storage device. The circulating storage devices 5 allow the items 3 to circulate continuously. The circulating storage devices 5 in particular have a circulation path which substantially corresponds to an elongated rectangle. The elongated rectangle has two parallel longitudinal tracks 14 the ends of which are interconnected by an in each case substantially semi-circular connection piece 15. It is conceivable for the circulation path of the temporary storage devices 5 to be configured in a manner that differs from the one shown in the FIGURE. The temporary storage devices may for instance have a circular circulation path, a square circulation path or a circulation path having any other shape. Both the longitudinal tracks 14 and the connection pieces 15 are provided with drives 16. Each of the drives 16 forms part of a conveyor unit which improves the continuous circulation of the items 3. The conveyor unit in particular ensures that a circulating conveyor speed in the circulating storage device 5 is variably adjustable. This is in particular done in such a way that the drive speed of at least one drive is variably adjustable. As a result, the circulation time of the items 3 in the circulating storage device 5 can be changed in a defined manner.

The storage capacity of each of the temporary storage devices 5 is selected in such a way that items 3 of more than one order can be stored temporarily in the temporary storage device 5.

In the region of the storage outlet 8 of each of the temporary storage devices 5, a switch unit 17 (not shown) is provided which may in particular comprise an identification unit (not shown). The identification unit integrated into the switch unit 17 is identical to the identification unit 12 integrated into the sorting unit 10. The switch unit 17 allows items 3 to be discharged form the temporary storage device 5 into the storage zone 9. As soon as all items 3 of an order are completely available in the temporary storage device 5, the items 3 are discharged into the collection zone 9 via the switch unit 17. As long as an order is incomplete, in other words not all items 3 of the order are available in the temporary storage device 5, the switch unit 17 causes the item 3 to be conveyed along the connection piece 15. The item 3 remains in the temporary storage device 5.

As in particular shown in the storage zone 9 on the left of the FIGURE, items 3 of different orders may be collected in the collection zone 9. By means of a second conveyor unit 18, items 3 of the completed orders can be conveyed form the collection zone 9 to a separation zone 19. The separation zone 19 has a number of delivery lines 20. In the illustrated exemplary embodiment, the separation zone 19 comprises four delivery lines 20. There may also be more than four, in particular twelve or fifteen delivery lines 20, or less than four delivery lines 20. The key feature is that each delivery line 20 delivers the items 3 as specified in the respective order. According to the FIGURE, the items 3 delivered to a common delivery line 20 have identical symbols so that all items 3 of a particular order are available at a common delivery line 20.

The second conveyor device 18 is provided with a number of drives 6 which are in particular identical to the drive 6 of the first conveyor device 4. According to the illustration of the FIGURE, the second conveyor device 18 has a horizontal first drive 6 which is connected to the collection zones 9. Said first drive 6 is used for removing the items 3 of the completed orders from the collection zones 9. A second drive 6 is connected to said first drive 6 which is shown in a vertical orientation in the FIGURE. According to the FIGURE, the second drive 6 is parallel to the delivery lines 20 of the separation zone 19. A third drive 6 is connected to said second drive 6 which allows the items 3 to be stored in the delivery lines 20 of the separation zone 19. The second drive 6 can also be omitted.

Alternatively, the second conveyor device 18 may also be provided with a number of second drives 6 which are in particular connected in series and/or in parallel. Each of the second drives 6 is in particular configured in such a way as to represent the capacity of the separation zone 19. According to the exemplary embodiment shown in the FIGURE, the second drive 6 is able to take up the items 3 of four orders since the separation zone 19 has four delivery lines 20. This means that two second drives 6 connected in series have a capacity for items 3 of eight orders. Correspondingly, eight completed orders may be stored in each collection zone 9. By providing more than one of the second drives 6, the capacity of each of the collection zones 9 may be increased. Correspondingly, three second drives 6 connected in series are able to take up the items 3 of twelve orders. The number of second drives 6 is a multiplier for the capacity of the collection zones 9. This allows orders, which are already complete and are conveyed from the collection zone 9 to the separation zone 19, to be stored temporarily in the region of the second conveyor device 18 near one of the second drives 6. Such a temporary storage of completed orders near one of the second drives 6 may be advantageous in order to additionally increase the capacity of the delivery lines 20 of the separation zone 19. Completed orders can be removed from the collection zones 19 at a high removal rate, thus allowing items 3 of completed orders to be removed from the temporary storage devices 5. As a result, blocking the take-up of new items into the temporary storage device 5 is prevented. In particular if a device is only provided with a reduced number of delivery lines 20, and if each of the orders, which are provided in the delivery lines in an in particular random sequence, comprises only a small number of items 3, the risk of a full utilization of the capacities of the temporary storage devices 5 increases. The delivery lines 20 in the separation zone 19 may also be blocked if there are other subsequent operating steps to be carried out with respect to the items 3 in the region of the delivery lines 20, such as packaging and/or recording the items 3 of an order by a customer. As a remedial measure, it is conceivable to either increase the capacities of the temporary storage devices 5 and/or to increasing the number of delivery lines 20 or to store completed orders temporarily by means of additional second drives 6.

A separation unit 21 is assigned to the delivery lines 20 of the separation zone 19. The separation unit 21 is substantially identical to the sorting unit 10 near the first conveyor device 4. The separation unit 21 interacts with an identification unit. The identification unit may be integrated into the separation unit 21. It is conceivable as well for the separation unit 21 to interact with an identification unit arranged for instance in the region of the storage outlet 8 of a temporary storage device 5. The interaction between the identification unit and the separation unit 21 ensures that the items 3 conveyed from the storage zone 9 to the separation zone 19, which may still be unsorted in the storage zone 9, are distributed among the delivery lines 20 according to the respective order. To this end, a switch 13 is provided in each inlet region of the delivery lines 20. The switches 13 are in particular identical to the switches 13 arranged near the first conveyor device 4. The switches 13, which are in each case arranged in an inlet region of the delivery lines 20, are in signal communication with the separation unit 21.

It is conceivable for the device 1 to be provided with a direct conveyor line (not shown). The direct conveyor line is provided in the region of the first conveyor device 4 as a branch line between the warehouse 2 and the sorting unit 10. The direct conveyor line directly connects the first conveyor device 4 with the separation zone 19. The direct conveyor line is used for direct conveyance of items 3, wherein a single item 3 forms an order. An order of this type consisting of only one item 3 does not require temporary storage. Since items 3 of this type can be conveyed directly from the first conveyor device 4 to the separation zone 19, i.e. in particular without temporary storage and sorting, the capacity of the temporary storage devices 5, the collection zones 9 and the conveyor devices is not unnecessarily exhausted. One-item orders of this type can be processed faster.

The separation zone 19 according to the illustrated exemplary embodiment has four delivery lines 20; therefore, the maximum permissible number of orders that may be temporarily stored in a temporary storage device 5 and/or in a collection zone 9 is limited to four orders. Generally speaking, the number n of delivery lines 20 of the separation zone 19 defines the maximum permissible number of different order types in the collection zone 9. The required storage capacity K of the temporary storage device 5 is obtained from the product of the number p of items 3 per order and the number n of orders. The storage inlet 7 and the storage outlet 8 for instance allow approximately 5000 items 3 per hour to be taken up or discharged. It is conceivable for the rate at which the items 3 are taken up into or discharged from the temporary storage device 5 to be increased to for instance 10000 items 3 or even more.

A transport of the items 3 from the collection zone 9 to the delivery lines 20 of the separation zone 19 occurs at a rate of conveyance which is increased relative to the rate for take up or discharge from the temporary storage device 5. The rate of conveyance for conveying the items 3 from the collection zone 9 to the separation zone 19 amounts to for instance at least 10000 items 3 per hour, in particular at least 15000 items 3 per hour. It is conceivable to increase the rate of conveyance to up to 20000 items 3 per hour or more.

Each of the delivery lines 20 is in a conveying connection with an outgoing goods zone 22.

The following is a more detailed description of the method according to the invention for providing the items 3 for more than one, in particular n, orders from the warehouse 2 to the outgoing goods zone 22 according to the respective order. A plurality of items 3 is removed from the warehouse 2 in the form of an unsorted flow of goods and conveyed to the sorting unit 10 along the direction of conveyance 11 of the first conveyor device 4. The flow of goods contains items 3 of more than one order. The items 3 are stored in different temporary storage devices 5 according to the respective order. This is done by means of the sorting unit 10. The identification unit 12, which interacts with the transponder attached to the items 3, is used to detect the items 3 which are then conveyed to a corresponding temporary storage device 5 via the switches 13. Via the storage inlet 7, the items 3 are conveyed to the predefined temporary storage device 5. The temporary storage device 5 is used to temporarily store the items 3. Each temporary storage device 5 is in particular used to temporarily store items 3 of more than one order. The storage inlet 7 may interact with an identification unit. Said identification unit may be the identification unit 12 which is integrated into the sorting unit 10. It is conceivable as well for each storage inlet 7 of a temporary storage device 5 to be provided with a separate identification unit 12. The identification unit 12 detects the items 3 stored in the temporary storage device 5. This information, in other words the number of items 3 of an order in the temporary storage device 5, may be transmitted to a central control device 23. The central control device 23 in particular contains information defining the items 3 which are comprised in the corresponding order. Correspondingly, the control unit 23 can be used to check whether the items 3, which are temporarily stored in the temporary storage device 5 and are required for a particular order, are already completely available. As soon as all items 3 required for the order are available in the temporary storage device 5, a corresponding completeness signal is triggered for instance by the identification unit 12 or by the central control device 23. The control device 23 is in particular configured as a warehouse management system and is used to control the flow of goods in the device 1. The central control device is in particular connected to all electric units of the device 1. The control device 23 is in particular in signal communication with the identification units 12, the switches 13, the sorting unit 10, the separation unit 21, the drives 6, 16, the temporary storage devices 5, in particular the storage inlets 7 and/or the storage outlets 8, the conveyor devices 4, 18, the collection zone 9 and the separation zone 19. For better clarity, these signal communication lines, which may be wired or wireless, are not shown in the FIGURE. A signal communication line is shown by way of example in the form of a line from the central control device to a drive 6 of the second conveyor device 18. All other signal lines may be identical and may in particular be configured such as to allow for a bidirectional flow of information.

The items 3 of an order are temporarily stored in the temporary storage device in such a way that the items 3 circulate continuously along a continuous track in a waiting loop.

As soon as all items 3 of an order are completely available in the temporary storage device 5, the items 3 of this order are discharged via the switch unit 17 at the storage outlet 8 and conveyed to the collection zone 9. Since the temporary storage device 5 contains the items 3 of more than one order in an unsorted manner, the items 3 of the completed orders may be arranged in the collection zone in an unsorted manner as well. For instance as soon as the collection zone 9 is full, the items 3 are conveyed from the collection zone 9 to the separation zone 19 via the second conveyor device 18. The separation unit 21 and the switches 13 connected thereto are used to distribute the items 3 among the delivery lines provided for this purpose according to the respective order. The completed orders in the delivery lines 20 may then be conveyed to the outgoing goods zone 22.

In the separation zone 19, the items 3 are distributed among the delivery lines 20 according to the respective order. The items 3 are thus entirely separated. The sequence of the items 3 per order, in other words the sequence of the items 3 in one delivery line 20, is not important. The method in particular distinguishes itself by the fact that a continuous flow of goods is achievable from the warehouse 2 to the separation zone 19 comprising the delivery lines 20 and the outgoing goods zone 22 via the temporary storage devices 5 and the collection zones 9 which are in each case connected thereto. The central control device 23 allows the method according to the invention to be carried out in a fully automated manner. An intervention of an operator can be dispensed with.

An essential advantage of designing a temporary storage device in the form of a circulating storage device is that for instance items 3, which do not form a complete order yet and are taken up into the temporary storage device 5 at an early stage, are able to circulate in the circulating storage device while however ensuring that items 3, which are for instance taken up into the temporary storage device 5 at a later stage, in particular in groups, and form a complete order, may enter the collection zone 9 directly via the circulating storage device 5 without requiring an additional circulation. As a result, the risk of an accumulation of items in the flow of goods is reduced.

What is claimed is:

1. A device for providing items for more than one order from a warehouse according to each particular order, the device comprising:
    a. a plurality of temporary storage devices linked with a warehouse for temporarily storing items of at least one order;
    b. a plurality of collection zones, each of the collection zones linked with one of the temporary storage devices for collecting the items of the at least one completed order;
    c. a separation zone having a number of delivery lines for providing the items of the at least one completed order according to the respective order,
    wherein each of the collection zones is connected with each of the delivery lines via a conveyor device.

2. A device according to claim 1, comprising a sorting unit for conveying the items to the at least one temporary storage device in a sorted manner.

3. A device according to claim 1, comprising a control device for controlling the flow of goods.

4. A device according to claim 1, wherein each delivery line is assigned to a separation unit which interacts with an identification unit.

5. A device according to claim 1, wherein the at least one temporary storage device has a storage capacity such that items of more than one order can be temporarily stored in the at least one temporary storage device.

6. A device according to claim 1, wherein the at least one temporary storage device has a storage inlet and a storage outlet, wherein an identification unit interacts with at least one of the group comprising the storage inlet and the storage outlet for identifying the items.

7. A device according to claim 6, comprising a switch unit at the storage outlet for one of the group comprising a continuous temporary storage of the items in the temporary storage device and a removal of the items from the temporary storage device.

8. A device according to claim 1, wherein the temporary storage device is configured as a circulating storage device.

9. A device according to claim 8, wherein the circulating storage device has a conveyor unit which is driven by means of at least one drive.

10. A device according to claim 1, comprising an identification key which is assignable to an item for automatic identification of the item.

11. A device according to claim 10, wherein the identification key is a transponder.

12. A method for providing items for more than one order from a warehouse according to each particular order, the method comprising the following method steps:
- removing items from a warehouse;
- conveying the items to at least one temporary storage device according to the respective order;
- temporarily storing the items of one order until all items of this order are available in the at least one temporary storage device;
- discharging the items of the completed order from the at least one temporary storage device into a collection zone linked therewith;
- conveying the items of the respective order from the collection zone to an arbitrary delivery line of a separation zone provided for the completed order as soon as the order is completed;
- providing the items of the completed order in the delivery line of the separation zone.

13. A method according to claim 12, comprising a discharge of the items of the completed order from the delivery line to an outgoing goods zone.

14. A method according to claim 12, wherein temporary storage is carried out by a circulation of the items in the temporary storage device configured as circulating storage device.

15. A method according to claim 12, wherein the items are conveyed to the at least one temporary storage device regardless of a current arrangement of the items which are already temporarily stored in the temporary storage device.

16. A method for providing items for more than one order from a warehouse according to each particular order, the method comprising the following method steps:
- removing items from a warehouse;
- conveying the items to at least one temporary storage device according to the respective order;
- temporarily storing the items of one order until all items of this order are available in the at least one temporary storage device;
- discharging the items of the completed order from the at least one temporary storage device into a collection zone linked therewith;
- conveying the items of the respective order from the collection zone to an arbitrary delivery line of a separation zone provided for the completed order as soon as the order is completed;
- providing the items of the completed order in the delivery line of the separation zone,
- the method further comprising examining whether the item available at a storage outlet of the temporary storage device is assigned to a completed order.

* * * * *